US010648518B2

(12) United States Patent
LeBeau et al.

(10) Patent No.: US 10,648,518 B2
(45) Date of Patent: May 12, 2020

(54) SYNCHRONOUS ENGAGEMENT CLUTCH

(71) Applicant: Hamilton Sundstrand Corporation, Charlotte, NC (US)

(72) Inventors: Erik D. LeBeau, Mokena, IL (US); Weishun Ni, Rockton, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/963,467

(22) Filed: Apr. 26, 2018

(65) Prior Publication Data

US 2019/0331176 A1 Oct. 31, 2019

(51) Int. Cl.
| F16D 43/00 | (2006.01) |
| F16D 43/10 | (2006.01) |
| F16D 43/06 | (2006.01) |
| F16D 43/16 | (2006.01) |
| F02C 7/277 | (2006.01) |
| F16D 13/04 | (2006.01) |
| F16D 41/064 | (2006.01) |
| F16D 43/12 | (2006.01) |

(52) U.S. Cl.
CPC .............. F16D 43/16 (2013.01); F02C 7/277 (2013.01); F16D 13/04 (2013.01); F16D 41/064 (2013.01); F16D 43/10 (2013.01); F16D 43/12 (2013.01)

(58) Field of Classification Search
None
See application file for complete search history.

(56) References Cited

U.S. PATENT DOCUMENTS

| 2,910,161 A | * | 10/1959 | Conlee | D06F 37/36 192/105 B |
| 2,937,730 A | | 5/1960 | Quenneville | |
| 5,419,420 A | | 5/1995 | Quenneville | |
| 9,157,494 B2 | | 10/2015 | Mitchell et al. | |

(Continued)

FOREIGN PATENT DOCUMENTS

| EP | 0592352 | 4/1994 | |
| GB | 866046 A | * 4/1961 | .............. F02C 7/277 |

OTHER PUBLICATIONS

The Extended European Search Report for EP Application No. 19171424.5, dated Jul. 17, 2019.

Primary Examiner — Charles A Fox
Assistant Examiner — Ryan P Dodd
(74) Attorney, Agent, or Firm — Carlson, Gaskey & Olds, P.C.

(57) ABSTRACT

A clutch assembly includes an output shaft extending along an axis and output teeth. A movable component is disposed adjacent to the output component. The movable component includes drive teeth and an annular engagement weight track including a groove circumscribing the axis. The movable component is movable between an engaged position, wherein the drive teeth are drivingly engaged with the output teeth, and a disengaged position, wherein the drive teeth are not engaged with the output teeth. An input component is disposed adjacent to the movable component. The input component includes engagement weight pockets. Spherical engagement weights are disposed in each engagement weight pocket. The groove has a generally uniform radial cross section across its circumference.

18 Claims, 9 Drawing Sheets

(56) References Cited

U.S. PATENT DOCUMENTS

2009/0000895 A1* 1/2009 Inomori .................. F16D 43/12
 192/31
2015/0354641 A1* 12/2015 Huber ..................... F16D 41/32
 192/46

* cited by examiner

SYNCHRONOUS ENGAGEMENT CLUTCH

BACKGROUND

This application relates to a synchronous engagement clutch, such as a clutch for use in a turbine starter for a gas turbine engine.

Turbine starters are used to drive engines, such as gas turbine engines, up to speed before ignition. A typical turbine starter may be driven by a power source, such as an auxiliary power unit (APU) or a ground air supply unit that supplies pressurized air to generate torque. A clutch is used to transfer torque from the power source to a shaft in the engine during startup and to disengage the power source from the engine after the engine starts running.

One variety of clutches uses spherical flyweights to engage and disengage depending on the state of the power source and engine operating speed. The power source drives a fixed member and a translating member, both having sloped pockets for the flyweights. The pockets are typically shallow relative to a diameter of the flyweights.

When the power source is running, the air turbine starter engagement and flyweights, or engagement balls, are centrifugally driven to outer ends of their respective pockets. The outward travel of the flyweights against the slope of the engagement ball pockets pushes the translating member into engagement with an assembly that transmits torque to the engine. The power source is cut off after the engine begins to run, and an opposing set of flyweights (disengagement balls) on the gearbox engine shaft side of the clutch pushes the translating member back out of position.

SUMMARY

In one exemplary embodiment, a clutch assembly includes an output shaft extending along an axis and output teeth. A movable component is disposed adjacent to the output component. The movable component includes drive teeth and an annular engagement weight track including a groove circumscribing the axis. The movable component is movable between an engaged position, wherein the drive teeth are drivingly engaged with the output teeth, and a disengaged position, wherein the drive teeth are not engaged with the output teeth. An input component is disposed adjacent to the movable component. The input component includes engagement weight pockets. Spherical engagement weights are disposed in each engagement weight pocket. The groove has a generally uniform radial cross section across its circumference.

These and other features of the present invention can best be understood from the following specification and drawings, the following of which is a brief description.

DETAILED DESCRIPTION

Figure 1:
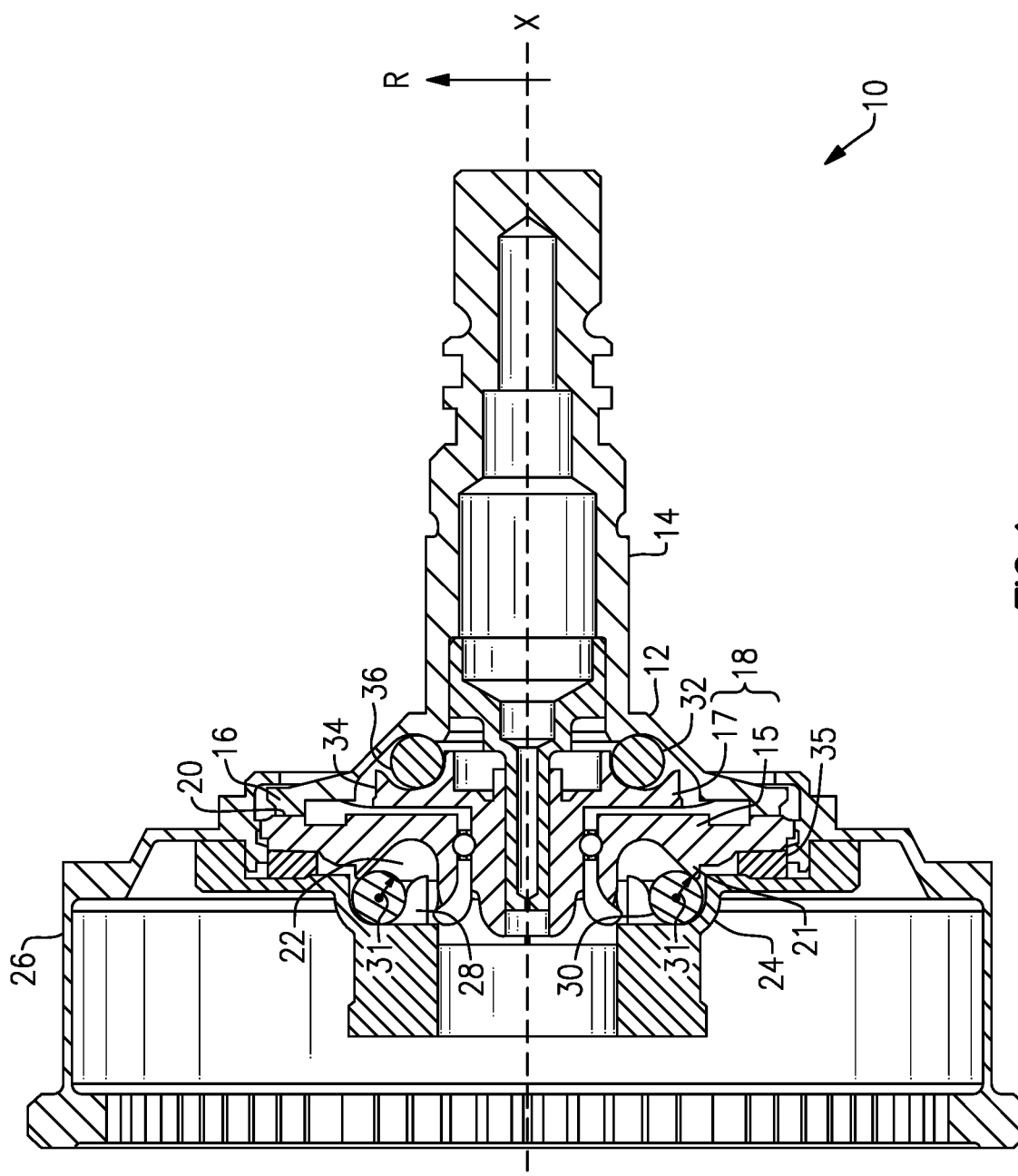
FIG. 1 is a sectional view of a clutch in an engaged position.

FIG. 1 shows a sectional view of a synchronous engagement clutch 10 in an engaged position. The clutch 10 includes an output component 12, a movable component 18 disposed adjacent to the output component 12, and a carrier support or input component 24 disposed adjacent to the movable component 18. The output component 12, movable component 18, and input component 24 are disposed along an axis X such that the movable component 18 is generally between the input component 24 and the output component 12.

The output component 12 includes an output shaft 14 extending along the axis X. In some embodiments, the output shaft 14 is drivingly connected to a gas turbine engine through an engine gearbox shaft. The output component 12 also includes output teeth 16 by which the output shaft 14 can be driven.

The movable component 18 has room to translate along the axis X, while the input component 24 and the output component 12 are fixed relative to the axis X within the clutch 10. The movable component 18 includes a ball guide starter 15, coupled to rotate about the axis X with the input component 24, and a ball guide output 17, coupled to rotate about the axis X with the output component 12. The ball guide starter 15 includes drive teeth 20 facing the output component 12. The ball guide starter 15 also has an annular weight track 21 including a groove 22 facing the input component 24.

The input component 24 is rotationally coupled to a drive member 26 whereby the input component 24 receives torque from a power source. In some embodiments, the power source is an auxiliary power unit (APU) for a turbine starter. In other embodiments, the power source is a ground air supply. The input component 24 further includes engagement weight pockets 28 facing the weight track 21.

In the engaged position shown in FIG. 1, the drive teeth 20 are drivingly engaged to the output teeth 16 such that torque on the drive member 26 may be transmitted to the output shaft 14. In some embodiments, the engaged position puts the drive teeth 20 and output teeth 16 into an engagement condition that may ratchet such that torque on the input component 24 can drive the output component 12 in only one rotational direction. In further embodiments, the drive teeth 20 and output teeth 16 are opposing sawtooth face gears biased into engagement by a spring 25. When the output shaft 14 turns faster than the drive member 26, the spring 25 yields and the drive teeth 20 and output teeth 16 ratchet past each other.

Ratcheting engagement allows the output shaft 14 to turn faster than the drive member 26, and to continue turning when the drive member 26 is slowing down. In an exemplary startup process for a gas turbine engine, the drive member 26 is driven to bring the output shaft 14 up to speed before ignition. After ignition, the running gas turbine engine drives the output shaft 14, and pressurized air driving the drive member 26 is cut off. The turning output teeth 16 ratchet past the drive teeth 20 as the drive member 26 turns slower and eventually comes to a stop.

Spherical engagement weights 30 are trapped between the engagement weight pockets 28 and the weight track 21. On an opposite side of the movable component 18, spherical disengagement weights are trapped between disengagement weight pockets 34 in the ball guide output 17 of the movable component 18 and disengagement weight pockets 36 in the output component 12. The engagement weights 30 each have a radius 31, and a diameter equal to twice the radius 31. According to some embodiments, the radius 31 is 0.15625 inches, and a mass of each engagement weight is 0.00452 lbm. According to further embodiments, the disengagement weights 32 are equal in size and mass to the engagement weights 30.

The groove 22 and engagement weight pockets 28 are respectively contoured to generally provide decreasing axial distance between each other with increasing radial distance from the axis X. Thus, radially outward travel of the engagement weights 30 biases the movable component 18 and drive teeth 20 toward the output component 12 and output teeth 16. Such outward travel by the engagement weights 30 can be caused by centrifugal force when the input component 24 is rotating. The disengagement weight pockets 34, 36 are likewise respectively contoured to provide generally decreasing axial space between each other with increasing radial distance from the axis X. Outward travel of the disengagement weights 32 in a radial direction R caused by rotation of the output component 12 therefore biases the movable component away from the output component 12.

In some embodiments, the engagement weights 30 have a total mass greater than or equal to a total mass of the disengagement weights 32. In further embodiments, the clutch 10 includes more engagement weights 30 than disengagement weights 32. The clutch 10 therefore tends to stay in the engaged position when the drive member 26 and output shaft 14 rotate at the same speed. The clutch 10 also tends to stay in the engaged position when the drive member 26 and output shaft 14 are not rotating at all, because the spring 25 biases the movable component 18 toward the output component 12. The clutch 10 will disengage when a difference between a rotational speed of the output component 12 and a rotational speed of the input component 24 is great enough that biasing force from the disengagement weights 32 overcomes biasing force from the spring 25 and engagement weights 30.

Figure 2:
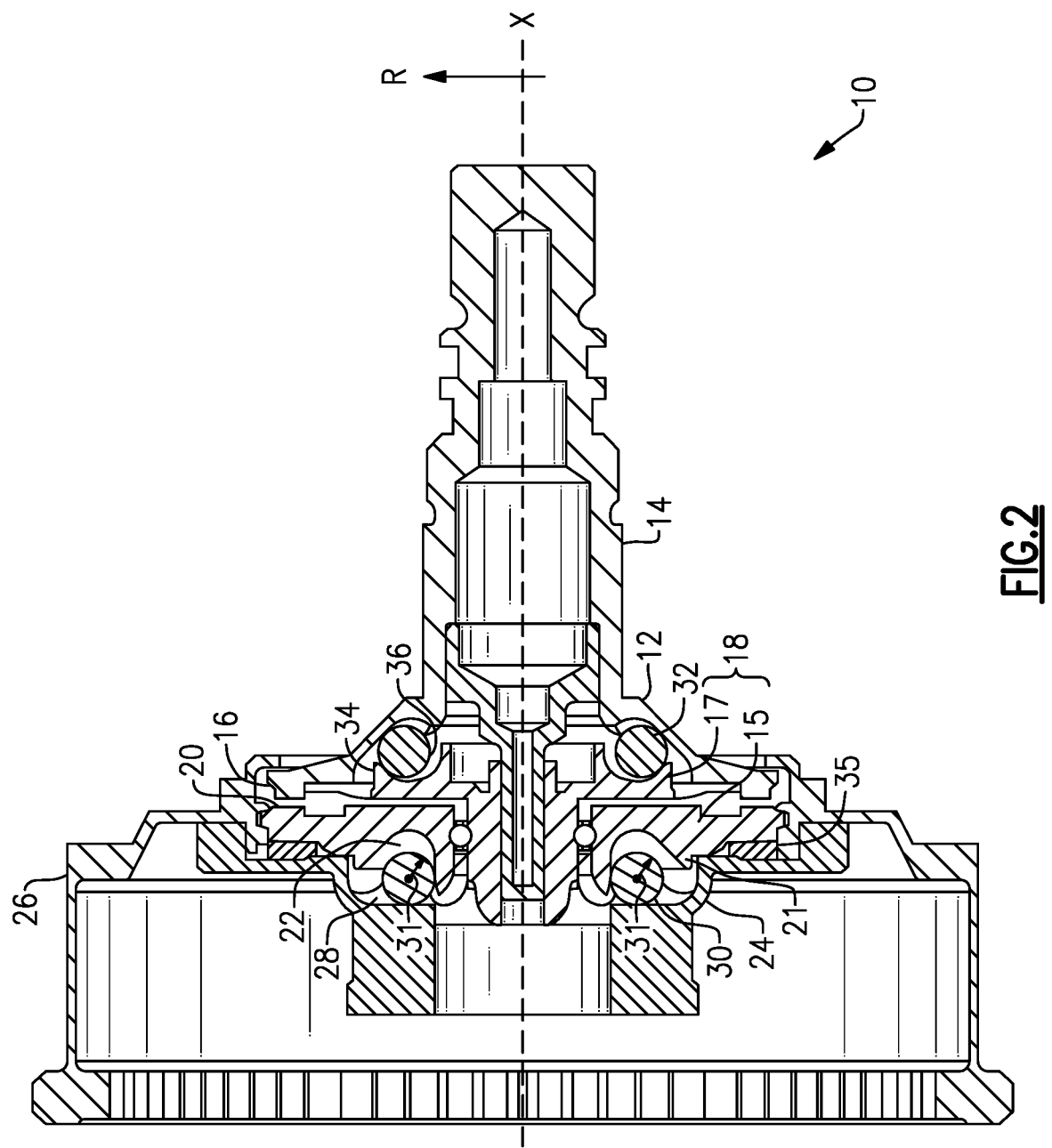
FIG. 2 is a sectional view of the clutch in a disengaged position.

FIG. 2 shows the clutch 10 in a disengaged position. In the disengaged position, the drive teeth 20 are clear of the output teeth 16. Compared to the engaged position, the disengaged position puts the movable component 18 axially further from the output component 12. The engagement weights 30 are at radially inner locations within the engagement weight pockets 28 and groove 22, while the disengagement weights 32 are at radially outer locations within the disengagement weight pockets 34, 36.

Figure 3A:
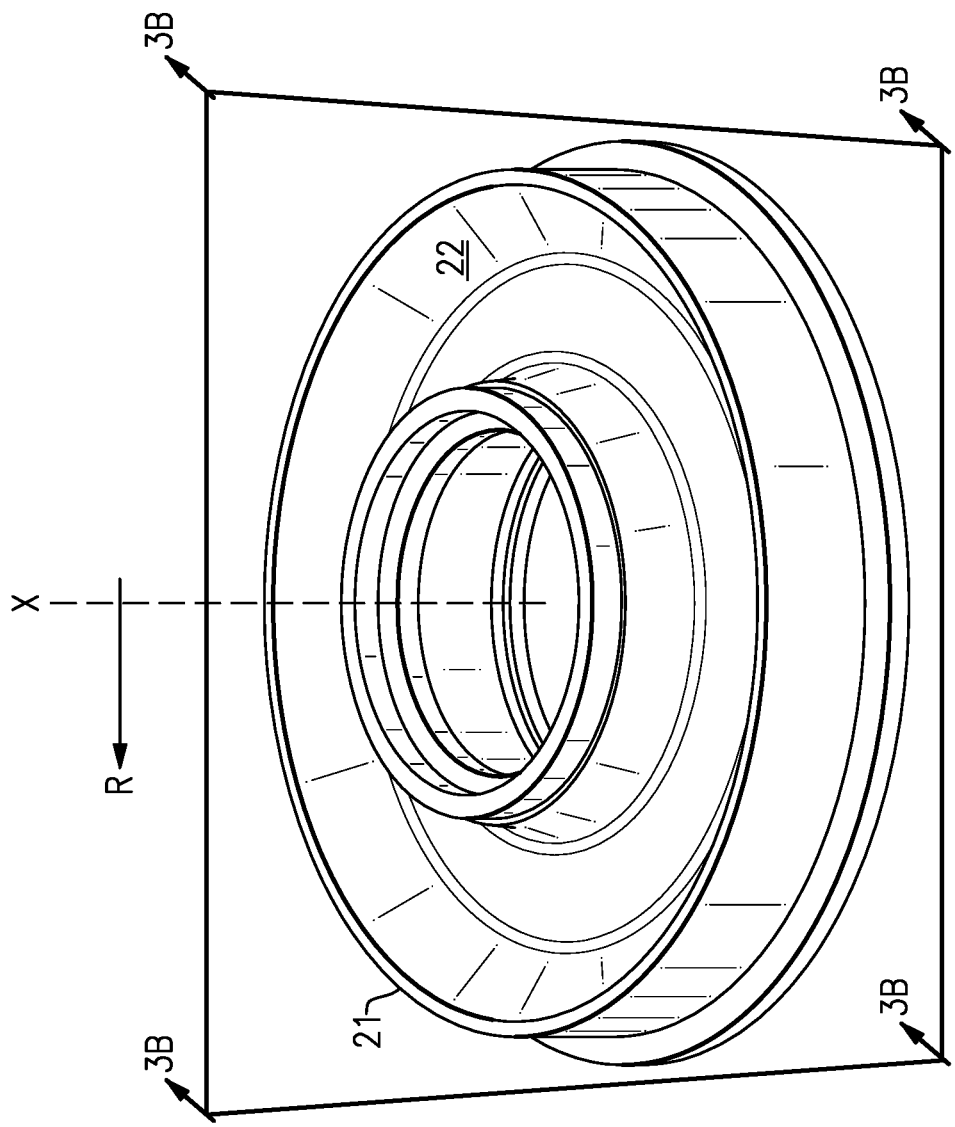
FIG. 3A illustrates a weight track.

FIG. 3A is an isolated drawing of the annular weight track 21 and groove 22. The weight track 21 and groove 22 circumscribe the axis X. The groove 22 has a generally uniform cross section across its circumference, meaning radial cross sections of the groove 22 at most circumferential locations have identical shapes, notwithstanding any manufacturing defects.

Figure 3B:
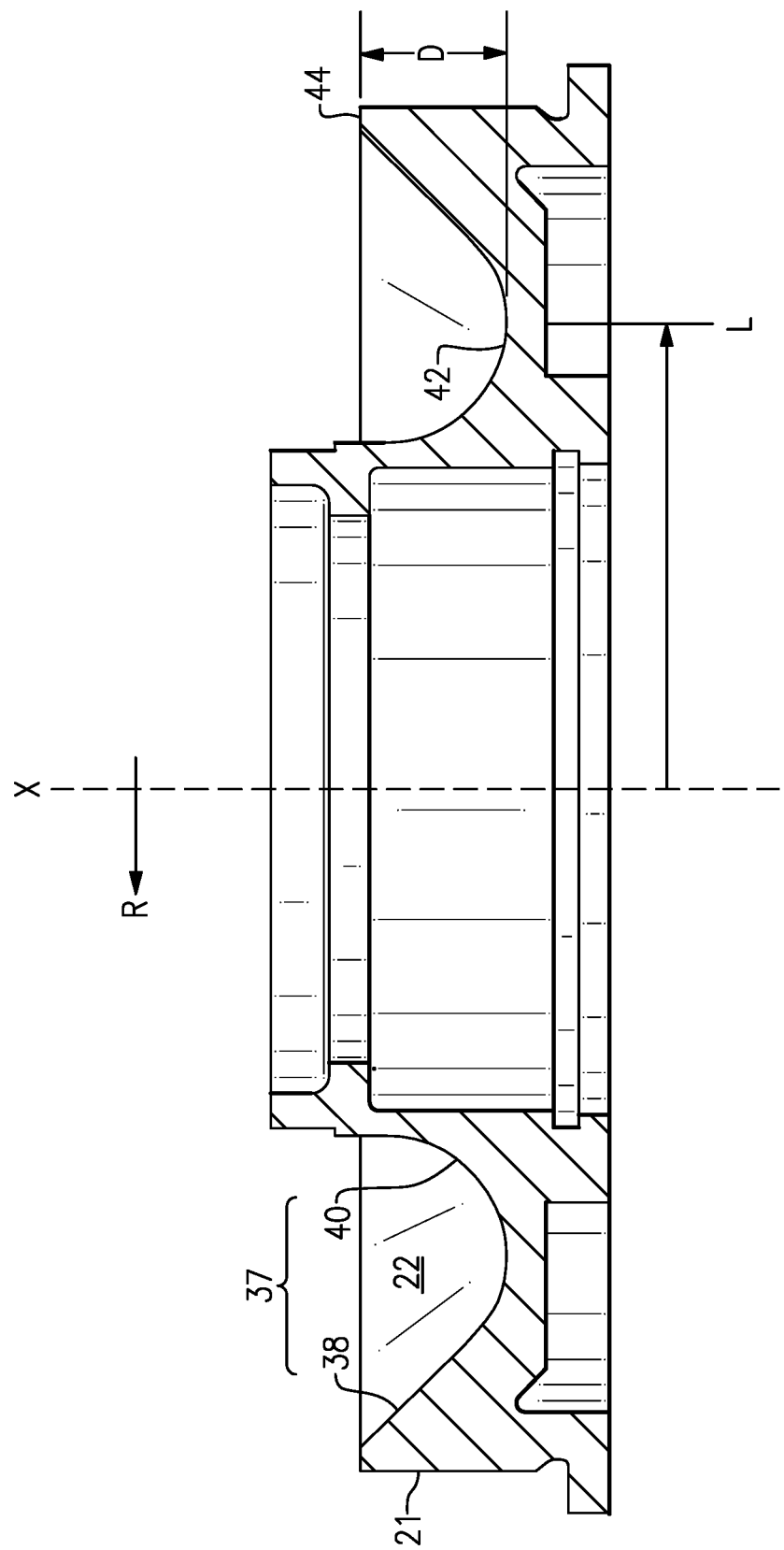
FIG. 3B is a cross-section along section 3B-3B.

FIG. 3B is a radial cross section of the groove 22. The groove 22 has a groove surface 37 that includes a slope 38 and a toroidal portion 40. According to the illustrated embodiment, the slope 38 is linear in radial cross section. Also according to the illustrated embodiment, the toroidal portion 40 defines more than a quarter of a circle in radial cross section, so the groove 22 defines at least a quarter of a torus.

The groove 22 also includes a deepest point 42, defined at a radial location L where the groove surface 37 is axially furthest from a radially outer lip 44. The groove 22 gets shallower with increasing radial distance from the axis X between the radial location L of the deepest point 42 and the lip 44. A depth D of the groove 22 is defined as a distance measured parallel to the axis X between the deepest point 42 and the radially outer lip 44. In some embodiments, the depth D is greater than or equal to the radius 31 of the engagement weights 30.

Figure 4A:
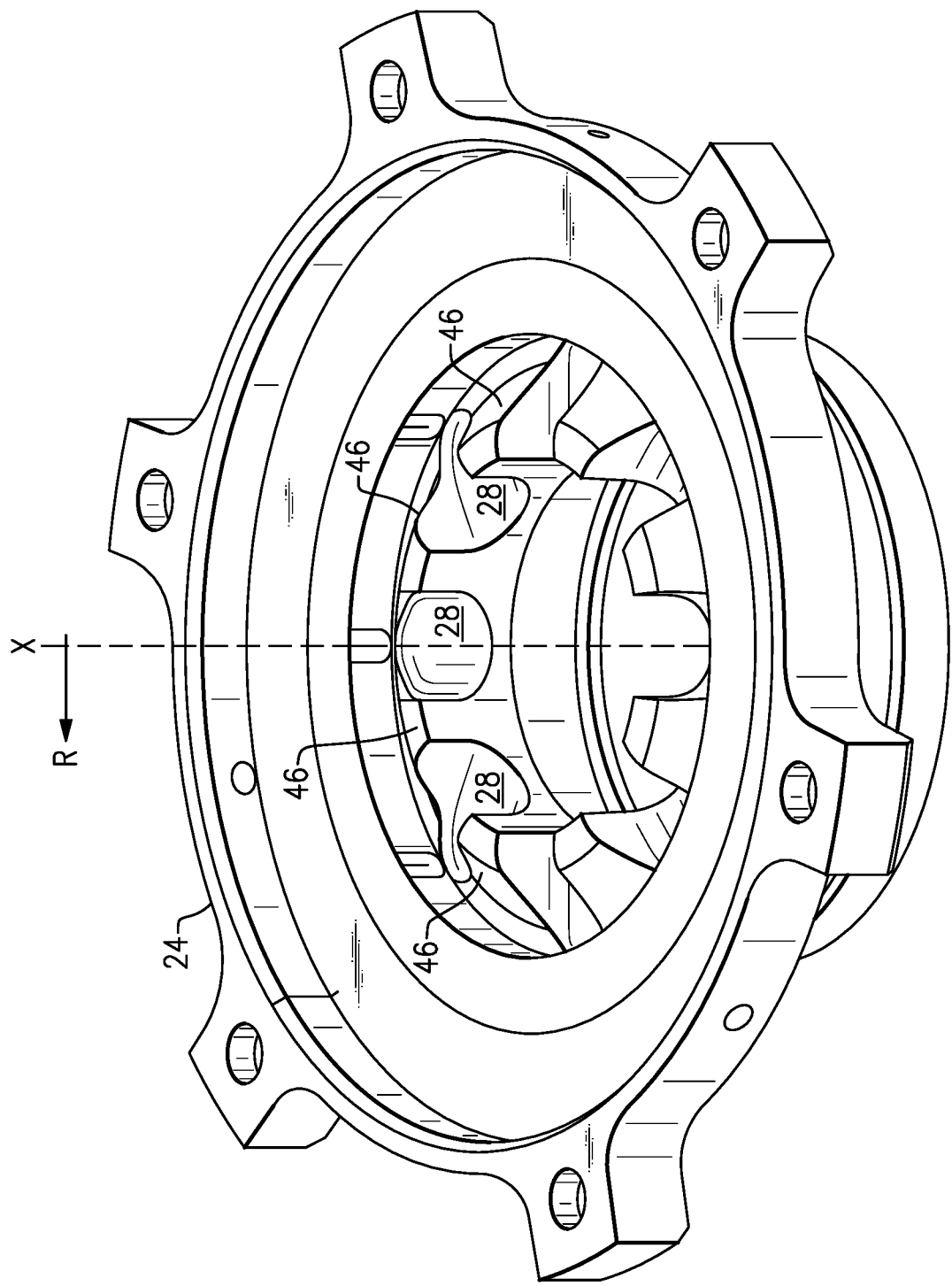
FIG. 4A is an oblique view of a carrier support.

FIG. 4A provides an oblique view of the carrier support or input component 24. The engagement weight pockets 28 are defined around the axis X between circumferentially spaced walls 46 extending axially away from the input component 24.

Figure 4B:
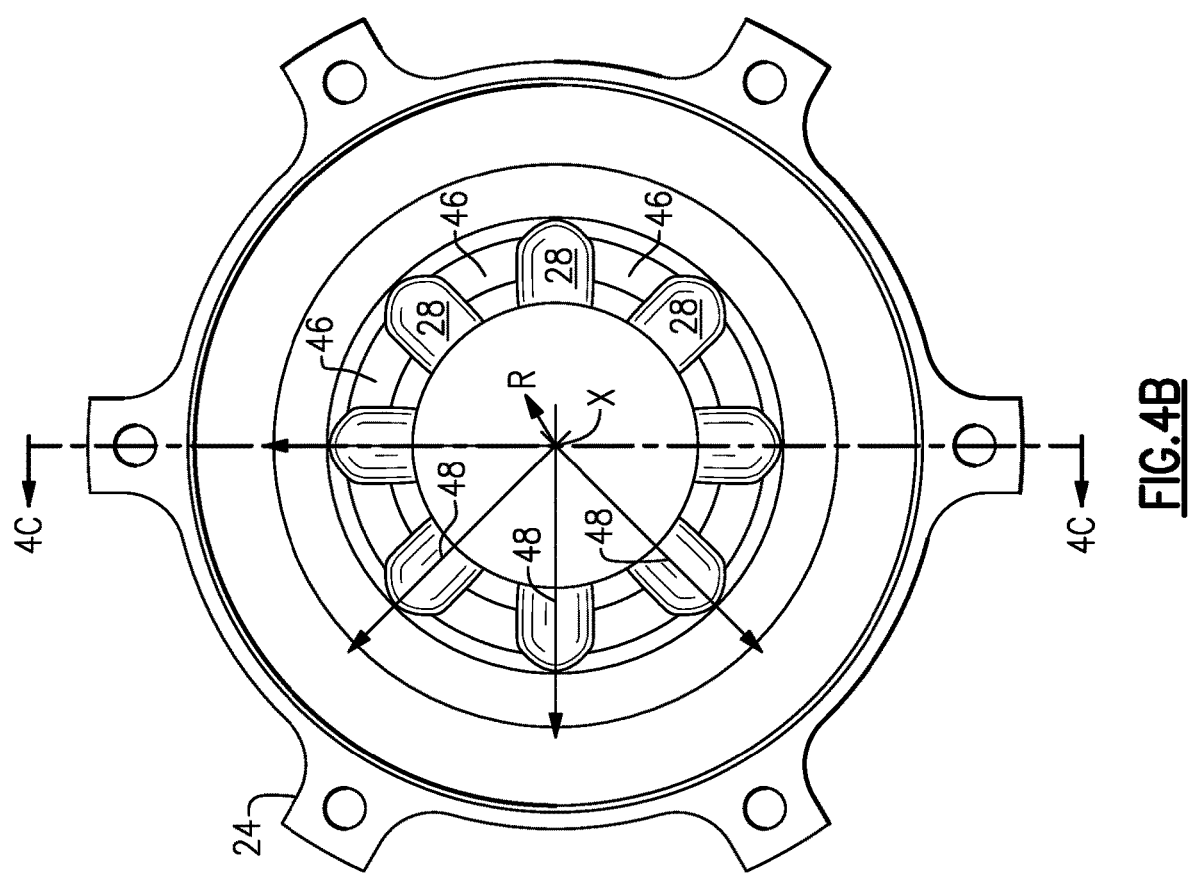
FIG. 4B is a top view of the carrier support.

A top view of the input component 24, shown in FIG. 4B, shows that each engagement weight pocket 28 is centered along a circumferential location C relative to the axis X. Each engagement weight pocket 28 has a surface including a trough 48 extending along each respective circumferential location C.

Figure 4C:
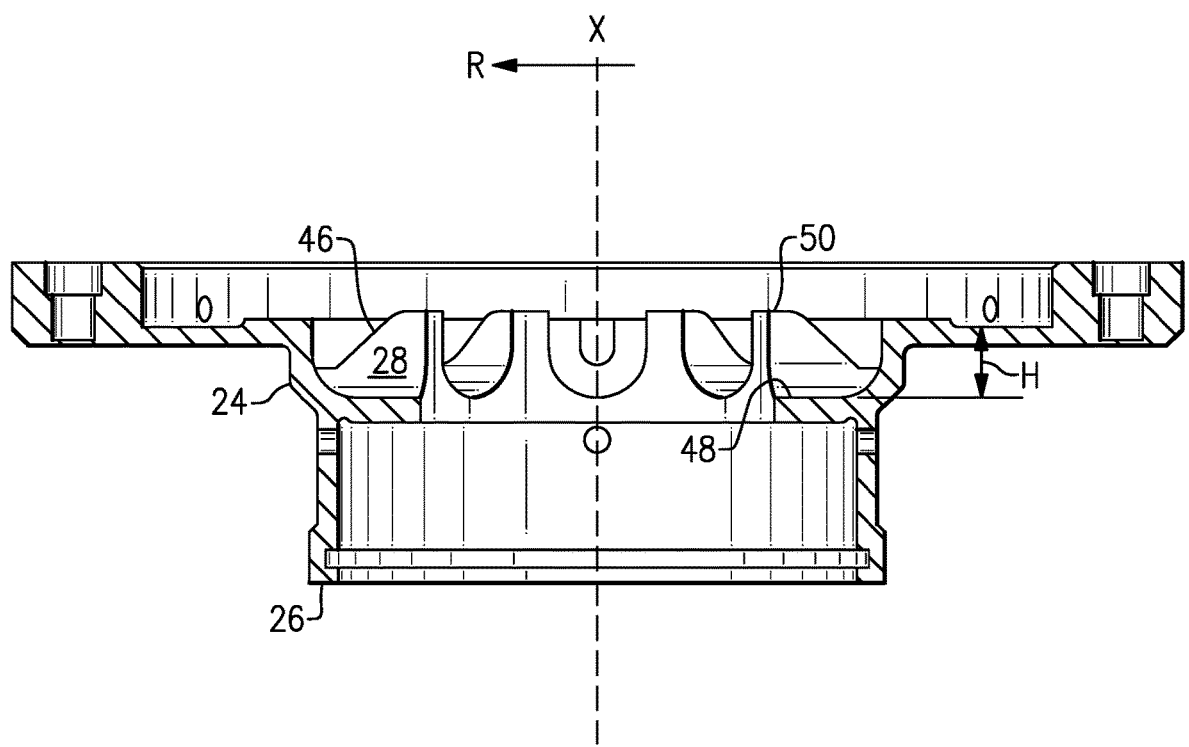
FIG. 4C is a cross-section along section 4C-4C.

Turning to FIG. 4C, the walls 46 each extend away from the input component 24 by a height H. The height H is defined as a distance measured parallel to the axis X between an axially outermost end 50 of the wall 46 and the trough 48 of adjacent engagement weight pockets 28. In some embodiments, the height H is greater than or equal to the radius 31 of the engagement weights 30. In the illustrated embodiment, the walls 46 have a wedge shape that generally extends axially further from the input component 24 with decreasing radial distance from the axis X, so the axially outermost end 50 of each wall is at a location relatively close to the axis X.

Figure 5A:
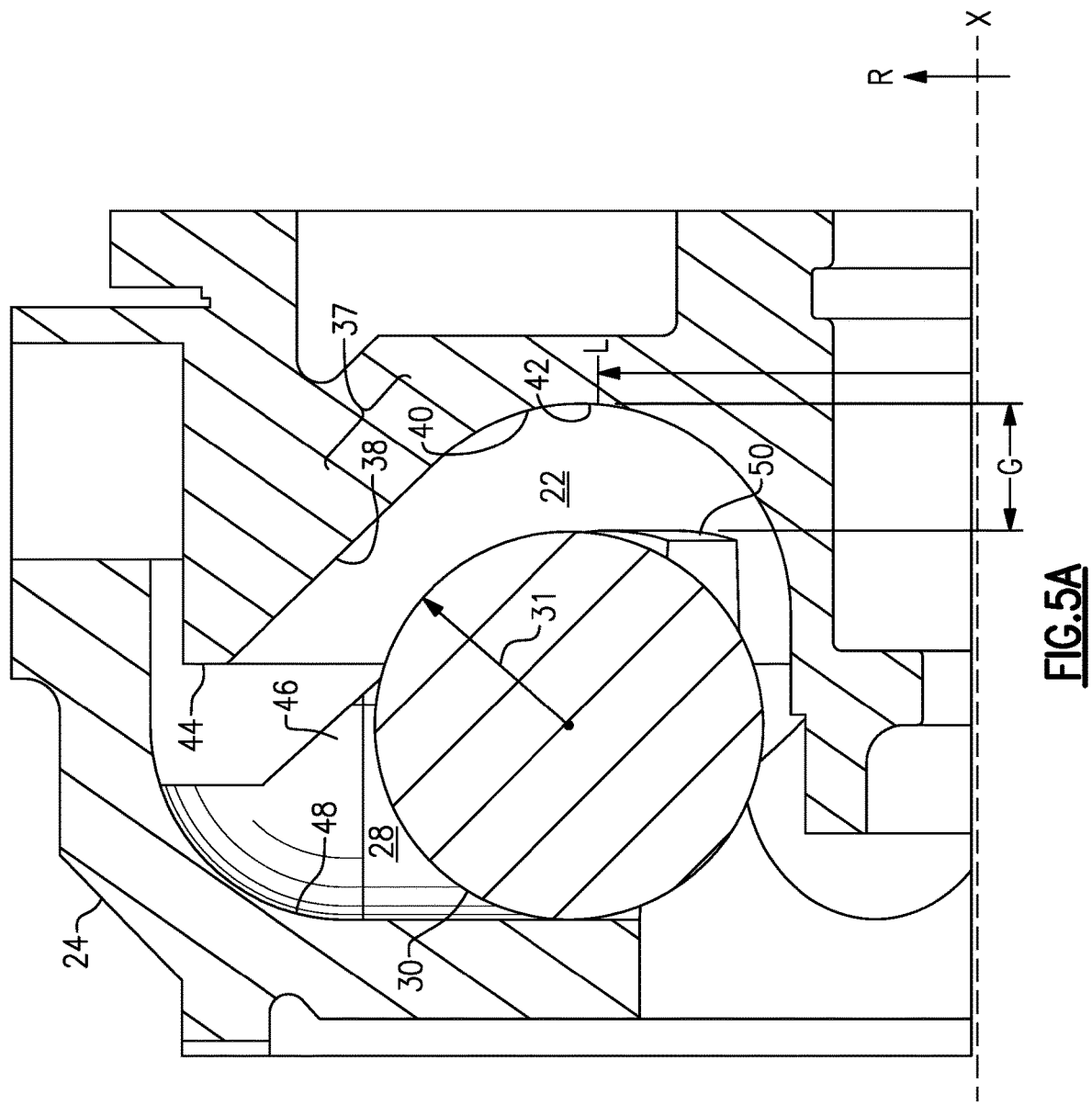
FIG. 5A is an enlarged portion of the sectional view of FIG. 2.

FIG. 5A shows an expanded view of an exemplary engagement weight pocket 28 and wall 46 of an assembled clutch 10 in a disengaged position. The wall 46 extends axially toward the movable component 18 past the lip 44 into the weight track 21. A gap G is defined as a distance measured parallel to the axis X between the axially outermost end 50 of the wall 46 and the deepest point 42 in the groove 22. In the disengaged position, the gap G is less than or equal to the radius 31 of the engagement weight 30.

The groove surface 37 and the trough 48 of the surface of the engagement weight pocket are respectively contoured such that axial space between the trough 48 and the groove surface 37 generally decreases with increasing distance from the axis past the radial location L of the deepest point 42. At some radial positions, the axial space between the trough 48 and the groove surface 37 is less than the diameter of the engagement weight 30 when the clutch 10 is in the disengaged position. As such, the engagement weight 30 is relatively restricted within the engagement weight pocket 28 while the clutch 10 is in the disengaged position.

Figure 5B:
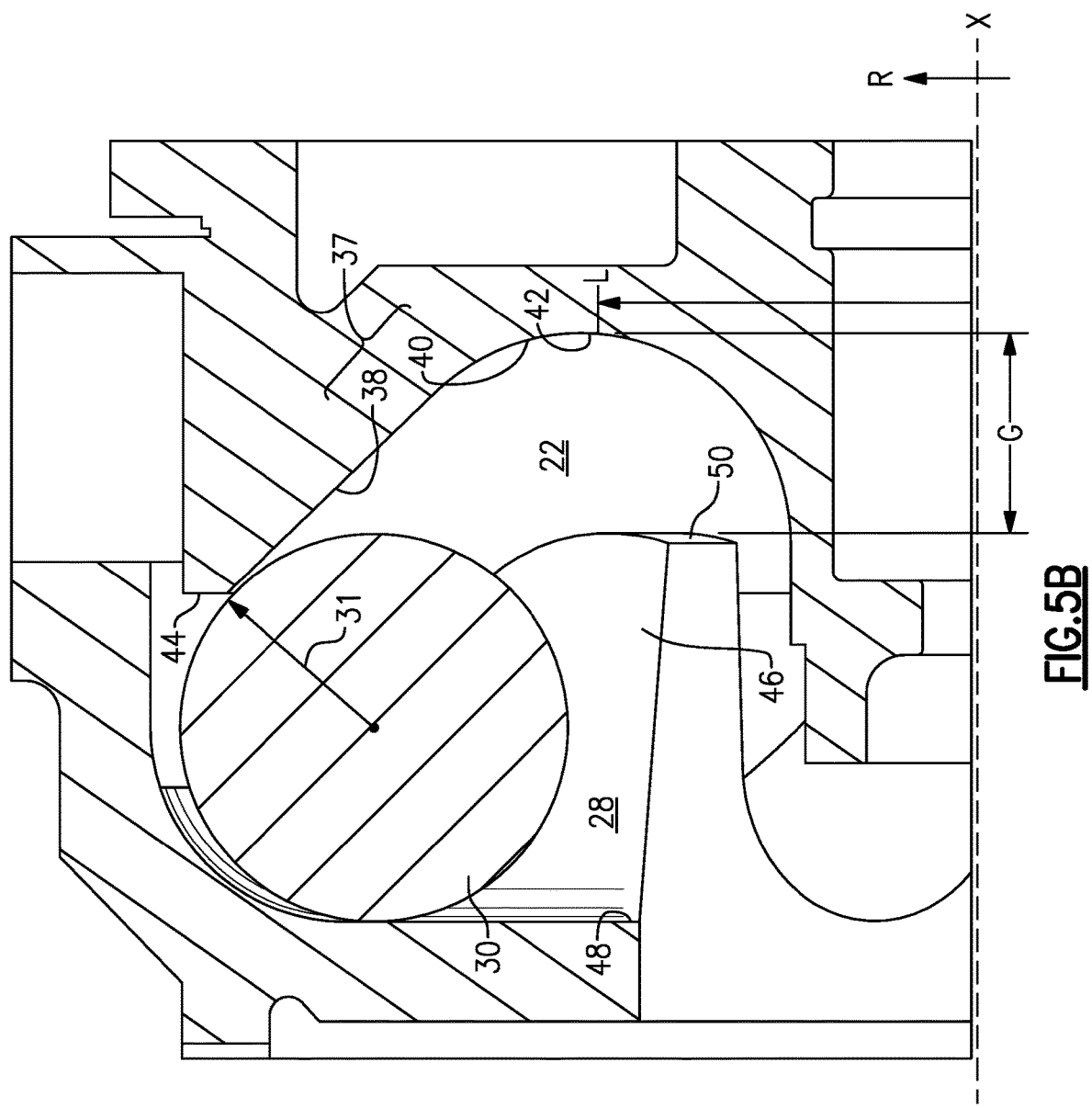
FIG. 5B is an enlarged portion of the sectional view of FIG. 1.

FIG. 5B shows an expanded view of the exemplary engagement weight pocket 28 and wall 46 while the clutch 10 is in the engaged position. The engagement weight 30 is at a radially outer position biasing the clutch 10 into engagement. The gap G is larger when the clutch 10 is in the engaged position, but the wall 46 still extends axially past the lip 44 into the track 21.

The embodiment described above is generally referred to as used in a turbine starter for a gas turbine engine, but it should be understood that the clutch 10 of this disclosure could be used in other applications.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A clutch assembly comprising:
an output component including an output shaft extending along an axis and output teeth;
a movable component disposed adjacent to the output component, the movable component including drive teeth and an annular engagement weight track including a groove circumscribing the axis, and movable between an engaged position, wherein the drive teeth are drivingly engaged with the output teeth, and a disengaged position, wherein the drive teeth are not engaged with the output teeth; and
an input component disposed adjacent to the movable component, the input component including engagement weight pockets; and
spherical engagement weights disposed in each engagement weight pocket; wherein
the groove has a generally uniform radial cross section across its circumference, and the groove defines at least a quarter of a torus.

2. The clutch assembly of claim 1, wherein the groove defines a slope that is linear on a radial cross section.

3. The clutch assembly of claim 1, adapted for use in a turbine starter for a gas turbine engine.

4. The clutch assembly of claim 1, wherein the groove has a depth measured parallel to the axis between a radially outer lip of the groove and a deepest point in the groove, and the depth is greater than or equal to a radius of one of the engagement weights.

5. The clutch assembly of claim 1, wherein the engaged position puts the drive teeth and output teeth in ratcheting engagement such that torque from the input component can drive the output component in only one rotational direction.

6. The clutch assembly of claim 1, wherein a plurality of circumferentially spaced walls extend axially from the input component toward the movable component by a distance that is greater than or equal to a radius of the engagement weights, and the engagement weight pockets are defined between the walls.

7. The clutch assembly of claim 6, wherein the groove has a radially outer lip extending axially toward the movable component, and at least part of each wall extends axially toward the input component past the lip.

8. The clutch assembly of claim 7, wherein a distance measured parallel to the axis between a deepest point in the groove and at least one point on each wall is less than or equal to the radius of the spherical engagement weights.

9. The clutch assembly of claim 8, wherein each wall includes a wedge shape that extends axially further from the input component with decreasing distance from the axis.

10. The clutch assembly of claim 6, wherein:
each engagement weight pocket is centered at a circumferential location and defines a pocket surface;
the groove has a deepest point at a radial location and defines a groove surface;
the groove surface and pocket surfaces are respectively contoured such that, at each of the circumferential locations, axial space between the groove surface and the respective pocket surface generally decreases with increasing distance from the axis beyond the radial location of the deepest point of the groove; and
at some radial positions along each of the circumferential locations, axial space between the groove surface and the pocket surface is less than a diameter of the engagement weights when the movable component is in the disengaged position.

11. A clutch assembly comprising:
an output component including an output shaft extending along an axis and output teeth;
a movable component disposed adjacent to the output component, the movable component including drive teeth and an annular engagement weight track including a groove circumscribing the axis, and movable between an engaged position, wherein the drive teeth are drivingly engaged with the output teeth, and a disengaged position, wherein the drive teeth are not engaged with the output teeth; and
an input component disposed adjacent to the movable component, the input component including engagement weight pockets; and
spherical engagement weights disposed in each engagement weigh pocket; wherein
a plurality of circumferentially spaced walls extend axially from the input component toward the movable component by a distance that is greater than or equal to a radius of the engagement weights, and the engagement weight pockets are defined between the walls; and
wherein the groove defines at least a quarter of a torus.

12. The clutch assembly of claim 11, wherein the groove has a radially outer lip extending axially toward the movable component, and at least part of each wall extends axially toward the input component past the lip.

13. The clutch assembly of claim 12, wherein a distance measured parallel to the axis between a deepest point in the groove and at least one point on each wall is less than or equal to the radius of the spherical engagement weights.

14. The clutch assembly of claim 13, wherein each wall includes a wedge shape that extends axially further from the input component with decreasing distance from the axis.

15. The clutch assembly of claim 11, wherein:
each engagement weight pocket is centered at a circumferential location and defines a pocket surface;
the groove has a deepest point at a radial location and defines a groove surface;
the groove surface and pocket surfaces are respectively contoured such that, at each of the circumferential locations, axial space between the groove surface and the respective pocket surface generally decreases with increasing distance from the axis beyond the radial location of the deepest point of the groove; and
at some radial positions along each of the circumferential positions, axial space between the groove surface and the pocket surface is less than a diameter of the engagement weights when the movable component is in the disengaged position.

16. The clutch assembly of claim 11, wherein the groove has a generally uniform radial cross section across its circumference.

17. The clutch assembly of claim 16, wherein the groove defines a slope that is linear on a radial cross section.

18. The clutch assembly of claim 15, wherein the groove has a depth measured parallel to the axis between a radially outer lip of the groove and a deepest point in the groove, and the depth is greater than or equal to a radius of one of the engagement weights.

* * * * *